Figures 1, 2:
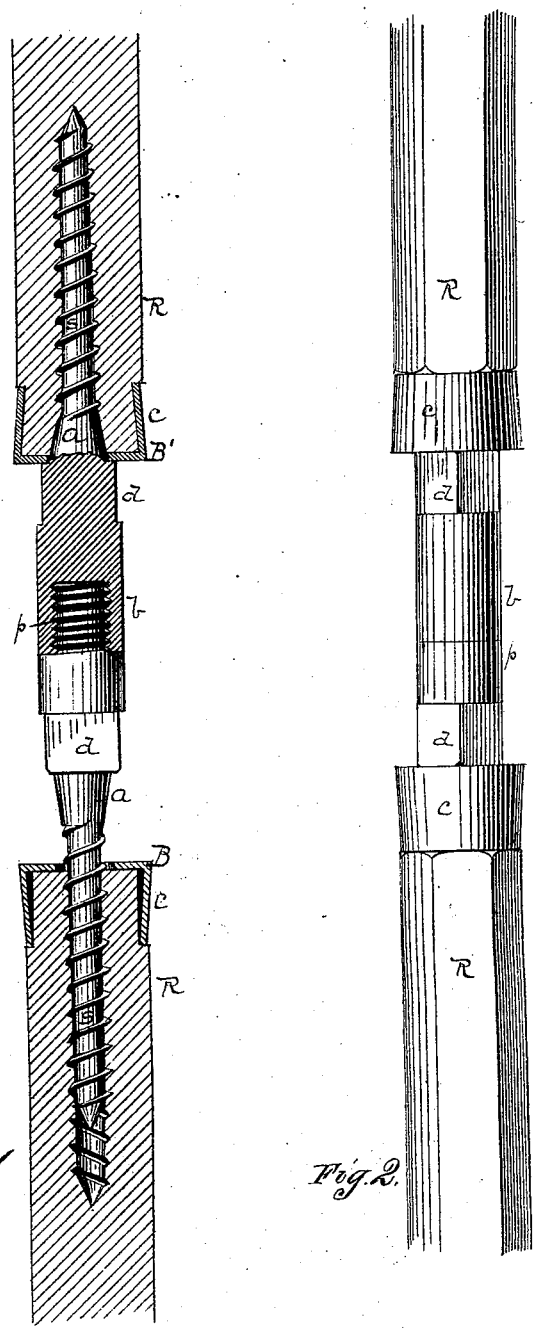

W. J. LEWIS.
SUCKER-ROD JOINT.

No. 184,718.  Patented Nov. 28, 1876.

Witnesses  Inventor William J. Lewis.
By Attorney George H. Christy

UNITED STATES PATENT OFFICE.

WILLIAM J. LEWIS, OF PITTSBURG, PENNSYLVANIA.

IMPROVEMENT IN SUCKER-ROD JOINTS.

Specification forming part of Letters Patent No. 184,718, dated November 28, 1876; application filed November 10, 1876.

*To all whom it may concern:*

Be it known that I, WILLIAM J. LEWIS, of Pittsburg, county of Allegheny, State of Pennsylvania, have invented or discovered a new and useful Improvement in Sucker-Rod Joints; and I do hereby declare the following to be a full, clear, concise, and exact description thereof, reference being had to the accompanying drawing, making a part of this specification, in which—like letters indicating like parts—

Figure 1 is a longitudinal section of a sucker-rod joint illustrative of my improvement, and Fig. 2 is an outside view of the same.

My improvement is designed for use with the ordinary wooden sucker-rods employed in oil and other bored wells, the ends of the rods being represented at R R, and the two parts or halves of the joint are secured together by the ordinary tapped box $b$ and threaded pin $p$. These parts are made each with a rectangular part, $d$, to which to apply a wrench in jointing and unjointing, as well as in attaching each part of the joint to its rod R. The outer or reverse end of each half of the joint terminates in a threaded screw, $s$, the threads of the screw preferably standing out well on the cylindrical shank or stem, the better to cut or embed themselves into the walls of the hole into which they are screwed, so as thereby to secure the greatest possible holding power as against the endwise strain to which they are subject in use; and while, with the addition of a cylindrical ferrule on the end of each rod R, to keep the wood from splitting, I deem this a sufficiently strong and secure joint for the purpose, I improve its construction by the addition of a conical wedge at the base of the screw, and a tapering ferrule on the end of each rod. This conical wedge is shown at $a$, and the ferrule at $c$. The conical wedge subserves two purposes: first, it gives additional strength at the base of the screw, where the greatest danger of breakage exists, and also makes provision for securing the ferrule in place without splitting the wood; and to this end the hole in the end of the rod R is bored smaller than the size of the base of the wedge $a$, and the ferrule is made tapering inward slightly at the end farthest from the end of the rod. Then the parts are put together, as represented at B, and the screwing in of the screws $s$ is continued until the wedge $a$ enters the end of the rod R, and spreads out laterally the end of the rod, so as to make it fill the enlarged end of the ferrule, as represented at B'. I thus form a dovetail joint on the end of each rod, which effectually secures the ferrule in place without splitting the end of the rod, and so as, by the use of the ferrule so applied, to prevent splitting under the lateral strain to which the rods and couplings are subject in use.

I claim herein as my invention—

1. A sucker-rod joint or coupling, consisting of box and pin $b\ p$ and screws $s\ s$, for connecting the same to the wooden sucker-rods, substantially as set forth.

2. The conical wedge $a$ on the base of the screw $s$, and tapering ferrule $c$, in combination with rod R, screw $s$, and box or pin $b\ p$, substantially as set forth.

In testimony whereof I have hereunto set my hand.

WILLIAM J. LEWIS.

Witnesses:
W. MACRUM,
GEORGE H. CHRISTY.